United States Patent [19]
Johnson

[11] Patent Number: 4,873,474
[45] Date of Patent: Oct. 10, 1989

[54] WINCH WITH SHUT-OFF LOAD LIMITER

[75] Inventor: Richard G. Johnson, Portland, Oreg.

[73] Assignee: Warn Industries, Inc., Milwaukie, Oreg.

[21] Appl. No.: 341,431

[22] Filed: Apr. 20, 1989

[51] Int. Cl.[4] .............................................. H02P 7/00
[52] U.S. Cl. .................................... 318/434; 318/433
[58] Field of Search ....................... 318/432, 433, 434;
242/86.5 R; 254/290, 292, DIG. 15; 294/82.3,
907; 414/562, 563

[56] References Cited

U.S. PATENT DOCUMENTS 3,965,407 6/1976 Stoner ................................ 318/432
4,517,506 5/1985 Heinrich et al. ................. 318/432 X

FOREIGN PATENT DOCUMENTS 54-153248 12/1979 Japan ................................... 318/432
56-12890 2/1981 Japan ................................... 318/432

Primary Examiner—Bentsu Ro
Attorney, Agent, or Firm—Robert L. Harrington

[57] ABSTRACT

A winch powered by an electric motor. A steel torroid determines the magnetic field generated by the current demand of the motor. A voltage sensitive hall effect switch is provided with a voltage input. The magnetic field detected by the steel torroid is also provided to the hall effect switch. Upon receiving the combined input of magnetic field and voltage, the hall effect switch is activated to shut off the motor. A potentiometer varies the voltage input to the hall effect switch to vary the demand of magnetic field necessary to activate the shut off function.

2 Claims, 2 Drawing Sheets

WINCH WITH SHUT-OFF LOAD LIMITER

FIELD OF THE INVENTION

This invention relates to a winch that is operated by an electric motor and is used to pull heavy loads, and more particularly it relates to a feature of the winch that automatically shuts off the electric motor if the load being pulled exceeds an operator determined load limit.

BACKGROUND OF THE INVENTION

Winches are used for a wide range of applications and many different sizes and types of winches are produced. Most winches are rated as having an upper load limit. Thus, a winch may be indicated as a 10,000 pound winch in which case the various load bearing components would be designed to withstand the applied forces to enable the winch to generate at least a 10,000 pound pulling force.

The problem occurs when a user is not aware that he is attempting to pull a load that exceeds the load limit of the winch. Without some sort of shut off, the weakest of the components will break down as the first indication that the load limit has been exceeded. Not only can this be costly in repair services and shut down time, it can also be a safety hazard. Even in cases where the components of the winch are designed to far exceed its load limit rating, the damage may occur to the winch support or to the item being pulled. The operator/user may simply want assurance that the load limit is not exceeded in any event.

The present invention provides a feature that senses when an established load limit is reached. Sensing features presently exist where a factory setting establishes the load limit. However, the present invention provides the additional benefit of allowing the operator/user to adjust the load limit setting.

BRIEF DESCRIPTION OF THE INVENTION

In the preferred embodiment, a limit switch is provided in the form of a hall effect switch. The electrical conductor for the winch motor is directed through a steel torroid to generate a magnetic field in the steel torroid that varies with the current demand of the motor. The switch is coupled to the winch motor and when the switch is energized, the winch motor is shut off.

The hall effect switch is energized by the combination of direct input voltage to the switch and the magnetic field from the steel torroid. For example, the direct voltage input to the switch may be at a determined value such as five volts, and with that voltage input the hall effect switch requires the additional input of a determined value of magnetic field such as 200 gauss. In order for the switch to be energized, the winch motor needs to draw the level of current that generates the 200 gauss magnetic field. At that point, the winch motor will be shut off. In the example given, the level of current demand that generates the value 200 gauss in magnetic field reflects the maximum load that the winch motor is allowed to pull.

In the hall effect switch described, if the voltage input to the switch is reduced, the magnetic field has to be increased in order to energize the switch. A potentiometer is inserted into the line between the voltage source and switch. The voltage input is decreased through adjustment of the potentiometer. Decreasing the voltage input thus produces the effect that a greater load on the winch is required in order for the limit switch to be activated, i.e. the effective load limit is increased.

The winch thus has a load limit adjustment with a minimum load limit setting established when the potentiometer is set at zero and a maximum load limit when the potentiometer is set at its maximum resistance. The pulling load forces can be callibrated to the various potentiometer settings to aid the operator in selecting the desired setting.

The invention will be more fully understood with reference to the following detailed description and the drawings.

DESCRIPTION OF THE DRAWINGS

With reference to FIG. 1, illustrated is a winch 10 including a drive motor 12 mounted to the bumper 14 of a vehicle 16. The motor 12 is connected to the vehicle battery 18 through conducting line 20. The motor 12 is activated by a manual switch (not shown) to wind a cable 22 onto a reel 8 of the winch 10 and thereby pull a load 24 (as indicated by arrow 26).

FIG. 2 illustrates the primary components of the present invention. The current carrying conducting line 20 is directed through a steel torroid 28. The steel torroid 28 detects the magnetic field generated by current flowing through line 20. The steel torroid is magnetically coupled to a hall effect switch 30 which reacts to the magnetic field detected by the steel torroid 28.

Figure 1:
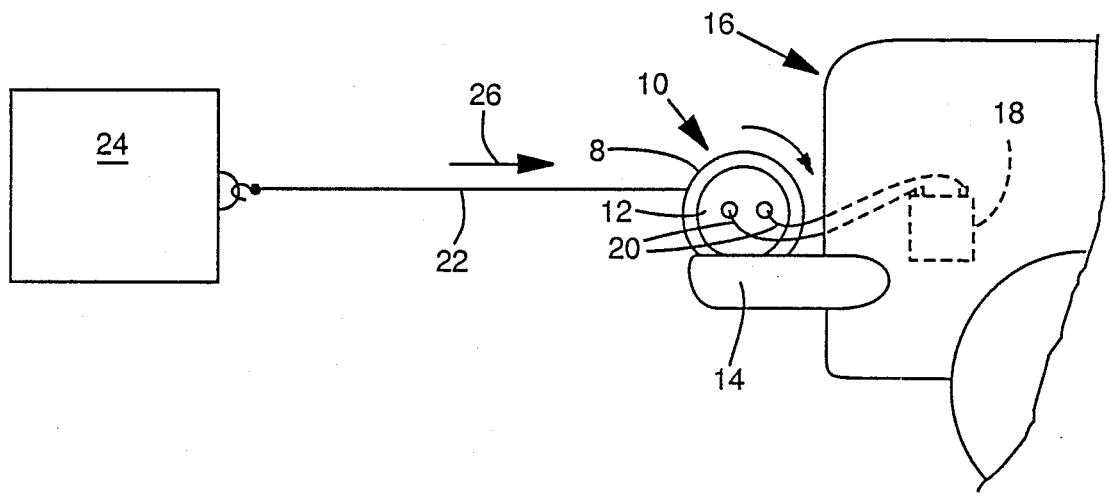
FIG. 1 a schematic illustration of a vehicle-mounted winch shown pulling a load.

A voltage input through line 32 is coupled with the field of the steel torroid 28 to activate, e.g. a switch 33 that shuts off the motor 12. The concept as generally described above is not new. A voltage sensitive hall effect switch having field input from a steel torroid, the steel torroid providing the function of sensing motor current, has been in use prior to this invention. However, heretofore no one has effectively provided the means whereby a user/operator could adjust the hall effect switch to vary the load limit.

The present invention utilizes a potentiometer 34 inserted into line 32 between the hall effect switch 30 and a voltage regulator 36 (the voltage regulator receiving current from vehicle battery 18). The wiper 38 of the potentiometer 34 is adjusted manually along the resistance bar 42 as indicated by arrow 40 to vary the voltage input to the hall effect switch 30.

Figure 2:
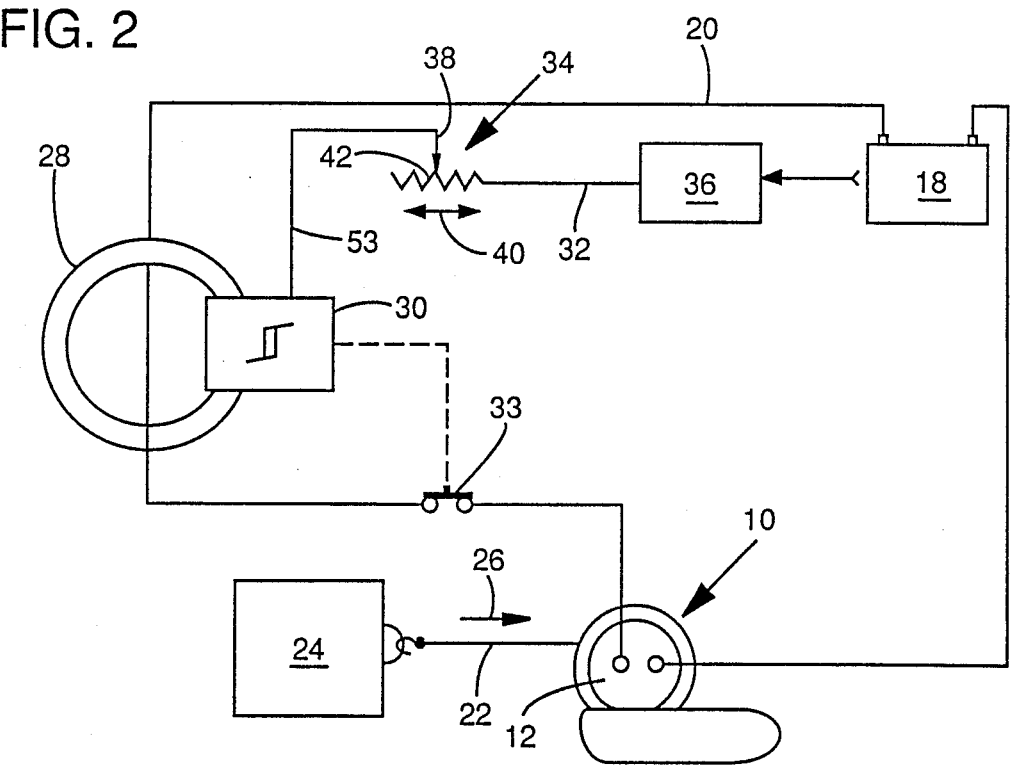
FIG. 2 is a simplified electrical diagram of the adjustable feature of the load limit switch of the present invention.

In operation, as the winch 10 is called on to pull increasingly heavier loads 24, the current drawn through line 20 by motor 12 increases, thereby increasing the magnetic field surrounding line 20. The increasing magnetic field is detected by steel torroid 28 and input to hall effect switch 30. The hall effect switch 30 is activated when the combined preset voltage and increasing magnetic field reaches a particular value. If the user/operator determines that switch 30 is activated at a too-low load limit, he simply moves wiper 38 along the resistance bar 42 to the left as seen in FIG. 2. This increases the resistance and lowers the voltage to line 53. With the voltage now fixed at a lower level, the magnetic field must reach a higher level before switch 30 will energize. The higher field occurs when a correspondingly higher current is reached which permits a greater demand on the motor.

Figure 3:
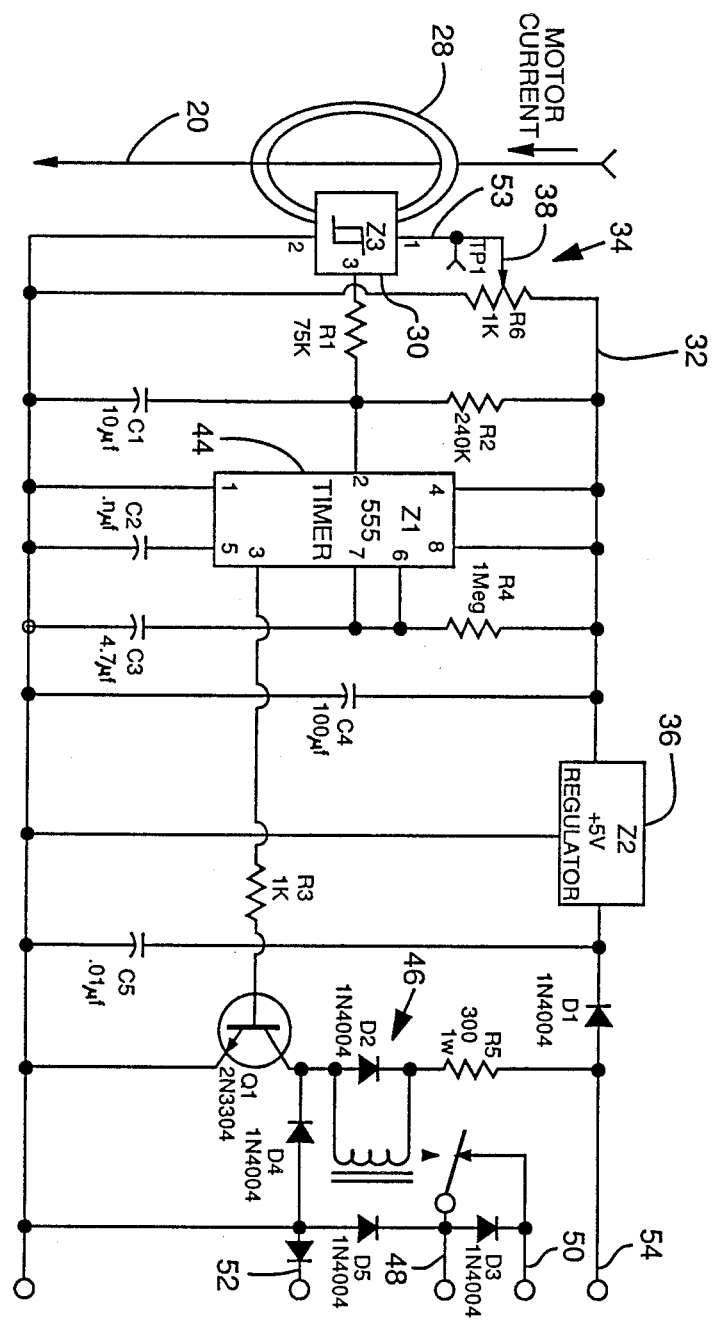
FIG. 3 is a more complete electrical diagram of the load limit switch circuitry.

Reference is now made to FIG. 3. Illustrated is the circuitry for the functions of a specific example of a load limit switch that has been produced. Those skilled in the art of electronics will be able to readily design the circuitry from the drawing. Accordingly, the circuitry will only generally be described in this written disclosure.

The circuitry is divided, as indicated, into an input section, timing section, power supply section and output section:

Input Section—The steel torroid 28, hall effect switch 30 and potentiometer 34 provide an adjustable, magnetically operated switching mechanism, which responds to motor current as described in connection with FIG. 2.

Timing Section—A monolithic timer 44 provides an "on" delay of 0.75 seconds to prevent spurious triggering. It also provides an "off" delay of 4.7 seconds when the hall effect switch is energized to protect the motor from rapid overloading.

Output section—The output section provides operating bias to the relay driver transistor which energizes the output relay, designated in general by arrow 46. This de-energizes the coils of the "power-in" solenoid (green wire 48) for a period of 4.7 seconds. This equates to the switch 33 of FIG. 2 describing the operation schematically.

Power supply section—The power input is through red wire 54 and is connected to a 100 MW,5 VDC regulator that provides a constant voltage source to the hall effect switch circuitry. Red wire 54 is connected to a 24 VDC battery (18) or a 12 VDC battery as typically provided for vehicle 16 on which winches 10 are mounted. The supply voltage is filtered and the switch circuit is protected from reverse current loads. "Power in" and "power out" winch operating modes are controlled with a manual switch (not shown) connected to yellow wire 50 and brown wire 52.

The novel concept resides in the modification to the hall effect switch circuitry whereby a potentiometer 34 is placed between the voltage regulator 36 (+5 VDC) and ground. The wiper 38 of the potentiometer 34 provides the user/operator with a capability to vary the applied voltage to the hall effect switch. The hall effect switch is a voltage sensitive device. Therefore, lowering its supply voltage from the nominal 5 VDC will decrease its sensitivity and require an increased magnetic field in the steel torroid 28 (generated by current flow in conducting wire 20) to activate the hall effect switch. In the specific example that was produced, the switch circuitry was designed to be activated when the motor drew a current of 100 amps at the low end of the potentiometer setting and 500 amps at the high end of the potentiometer setting.

The circuitry can, of course, be designed to cover different current ranges as will be apparent to those skilled in the art. Other modifications may be desirable depending on the application, size and type of winch, et. Accordingly, the scope of the invention is not limited to the specific examples given but instead is determined by reference to the following claims.

What is claimed is:

1. A winch comprising;
   a winching mechanism including a rotatable winch reel, a cable wound onto the reel adapted for being wound at least in part onto and off of the reel, and an electric motor for rotating the reel and winding the cable onto the reel and in a process pulling a load connected to the cable;
   an electrical power source providing electrical power to the motor, a load limit switching means for shutting off the power to the motor, and a hall effect switch responsive to the magnetic field generated by the electrical power source for activating the switching means and automatically shutting off the motor in response to a power demand by the motor indicating a load being pulled that exceeds an established load limit, and the improvement that comprises;
   a first conducting line from the electrical power source to the motor and a magnetic field detector means placed in proximity to the first conducting line for detecting the magnetic field generated in the first conducting line as an indicator of the power demand by the motor, said detector means connected to the hall effect switch and conveying the level of magnetic field detected in the first conducting line to the hall effect switch;
   a secondary power source providing a determined voltage through a second conducting line to the hall effect switch, and a potentiometer placed in the second conducting line between the secondary power source and hall effect switch, said potentiometer adapted to reduce the voltage from the secondary power source to the hall effect switch, and control means for controlling the amount of voltage reduction by the potentiometer and thereby determining in part the required magnetic field in the first conducting line of the motor required for activating the hall effect switch and the load limit switching means for shutting off the motor.

2. A winch as defined in claim 1 wherein the winch is adapted to be mounted to a vehicle and the electrical power for the winch motor is provided by the vehicle's battery, said secondary power source including a voltage regulator receiving power from the vehicle's battery and establishing a determined consistent and reduced voltage through the second conducting line.

* * * * *